(12) United States Patent
Wakao et al.

(10) Patent No.: US 7,543,153 B2
(45) Date of Patent: Jun. 2, 2009

(54) DIGITAL SIGNATURE GENERATING APPARATUS, METHOD, COMPUTER PROGRAM AND COMPUTER-READABLE STORAGE MEDIUM

(75) Inventors: Satoru Wakao, Yokohama (JP); Akira Akashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 725 days.

(21) Appl. No.: 10/797,827

(22) Filed: Mar. 10, 2004

(65) Prior Publication Data
US 2004/0230804 A1 Nov. 18, 2004

(30) Foreign Application Priority Data
Mar. 14, 2003 (JP) .............................. 2003-071033

(51) Int. Cl.
H04L 9/32 (2006.01)
H04L 9/00 (2006.01)
H04H 60/32 (2008.01)

(52) U.S. Cl. .................. 713/180; 713/176; 725/19; 380/44

(58) Field of Classification Search ................ 713/176, 713/180; 725/19; 380/44
See application file for complete search history.

(56) References Cited

U.S. PATENT DOCUMENTS

| | | | | |
|---|---|---|---|---|
| 5,396,558 A * | 3/1995 | Ishiguro et al. | ............... | 705/67 |
| 5,499,294 A | 3/1996 | Friedman | | |
| 6,038,551 A * | 3/2000 | Barlow et al. | .................. | 705/41 |
| 6,463,155 B1 * | 10/2002 | Akiyama et al. | ............ | 380/278 |
| 6,633,980 B1 | 10/2003 | Johnson | | |
| 6,782,103 B1 * | 8/2004 | Arthan et al. | ................ | 380/278 |
| 6,978,017 B2 * | 12/2005 | Wiener et al. | ................. | 380/30 |
| 7,000,112 B1 | 2/2006 | Oishi | | |
| 7,139,407 B2 | 11/2006 | Wakao | | |
| 7,162,637 B2 | 1/2007 | Wakao et al. | | |
| 7,194,630 B2 | 3/2007 | Iwamura et al. | | |
| 7,234,060 B1 * | 6/2007 | Amdur et al. | ................ | 713/176 |
| 7,296,161 B1 | 11/2007 | Wakao et al. | | |
| 2002/0060736 A1 | 5/2002 | Wakao et al. | | |
| 2003/0002679 A1 * | 1/2003 | Akiyama et al. | ............ | 380/278 |
| 2003/0123699 A1 | 7/2003 | Wakao et al. | | |
| 2003/0126443 A1 | 7/2003 | Wakao | | |

(Continued)

FOREIGN PATENT DOCUMENTS

EP 1081915 A2 3/2001

(Continued)

*Primary Examiner*—Nasser G Moazzami
*Assistant Examiner*—Mohammad W Reza
(74) *Attorney, Agent, or Firm*—Cowan, Liebowitz & Latman, P.C.

(57) ABSTRACT

A digital signature generating apparatus generates a digital signature of digital data. The digital signature generating apparatus includes a receiving unit, the secret key changing unit and a digital signature generating unit. The receiving unit receives one of a first command and a second command. The first command includes information indicating one of a plurality of secret keys, and the plurality of secret keys are included in the digital signature generating apparatus. The secret key changing unit changes a secret key used by the digital signature generating apparatus to a secret key specified by the first command, if the first command is received by the receiving unit. The digital signature generating unit generates the digital signature of the digital data from a hash value extracted from the second command, if the second command is received by the receiving unit.

10 Claims, 9 Drawing Sheets

U.S. PATENT DOCUMENTS

| | | |
|---|---|---|
| 2003/0196086 A1 | 10/2003 | Murakami |
| 2004/0059936 A1 | 3/2004 | Wakao |
| 2004/0162980 A1* | 8/2004 | Lesenne et al. ............. 713/153 |
| 2005/0091497 A1 | 4/2005 | Wakao |

FOREIGN PATENT DOCUMENTS

| | | | | |
|---|---|---|---|---|
| JP | 09-200730 | | | 7/1997 |
| JP | 10031626 | A | * | 2/1998 |
| JP | 11088318 | A | * | 3/1999 |
| JP | 2000124887 | A | * | 4/2000 |
| JP | 2002-244924 | | | 8/2002 |
| JP | 2002300150 | A | * | 10/2002 |
| JP | 2004015598 | A | * | 1/2004 |

* cited by examiner

FIG. 1
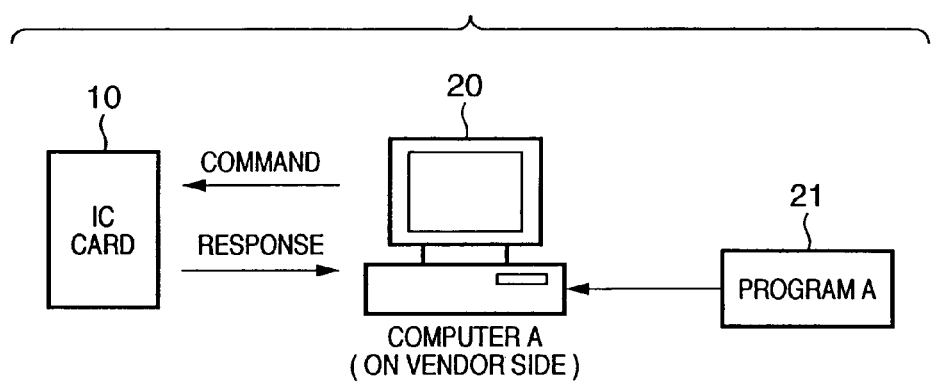
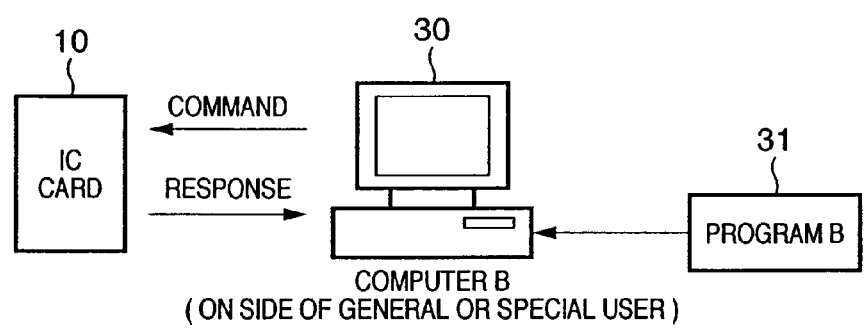

| FLAG | KEY NO. | SECRET KEY |
|------|---------|------------|
| ON | 0 | 0x9876543210AB... |
| OFF | 1 | 0x876543210ABC... |
| OFF | 2 | 0x76543210ABCD... |
| : | : | : |
| OFF | 15 | 0xF9876543210A... |

- 0x9876543210AB... } SECRET KEY FOR GENERAL USER
- 0x876543210ABC... / 0x76543210ABCD... / ... / 0xF9876543210A... } SECRET KEY FOR SPECIAL USER

AFTER KEY CHANGE COMMAND
(WHICH SPECIFIES KEY NO. 2) IS EXECUTED

| FLAG | KEY NO. | SECRET KEY |
|------|---------|------------|
| OFF | 0 | 0x9876543210AB... |
| OFF | 1 | 0x876543210ABC... |
| ON | 2 | 0x76543210ABCD... |
| : | : | : |
| OFF | 15 | 0xF9876543210A... |

- SECRET KEY FOR GENERAL USER
- SECRET KEY FOR SPECIAL USER

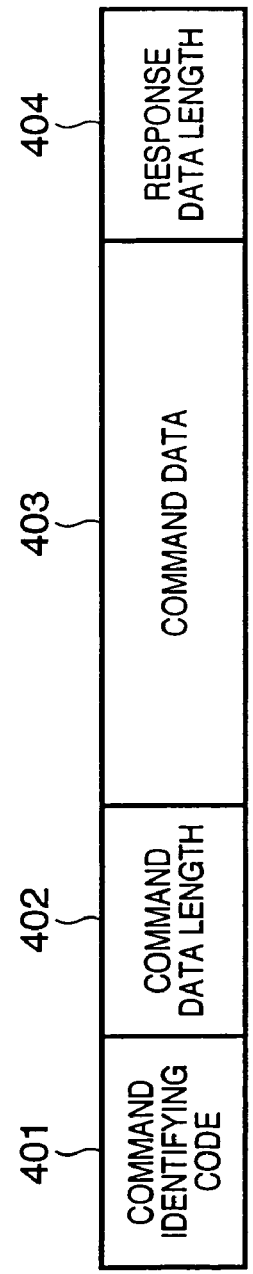

FIG. 9
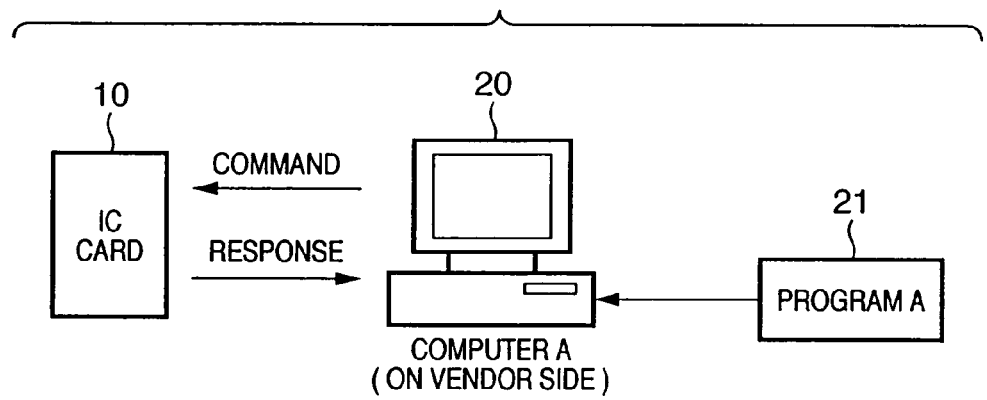
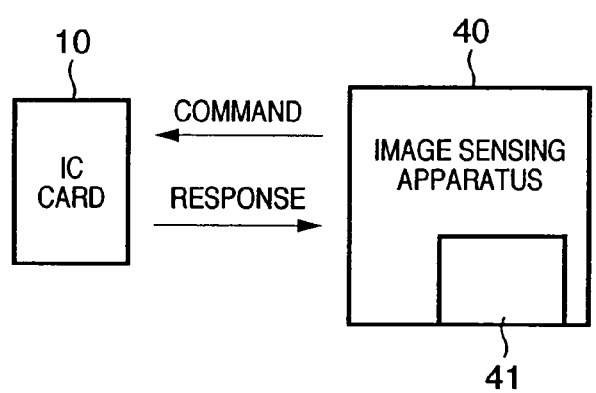

DIGITAL SIGNATURE GENERATING APPARATUS, METHOD, COMPUTER PROGRAM AND COMPUTER-READABLE STORAGE MEDIUM

FIELD OF THE INVENTION

This invention relates to a digital signature generating apparatus and method, a computer program therefor and a computer-readable storage medium storing this computer program.

BACKGROUND OF THE INVENTION

Digital cameras that store the optical image of a subject in digital form are now in actual use. An advantage of image data captured by a digital camera is that the data is easy to utilize and manipulate. However, this means that the image data can also be altered with ease. A problem which arises as a consequence is that the trustworthiness of a photograph taken by a digital camera is inferior to that of an emulsion photograph and lacks the ability to serve as evidence. For this reason, a digital camera system having a function for adding a digital signature to captured image data has been proposed in recent years. For example, see the specifications of U.S. Pat. No. 5,499,294 and Japanese Patent Application Laid-Open No. 9-200730.

However, since public-key encryption schemes such as RSA encryption ordinarily used in generating digital signatures require an exponentiation operation or a remainder operation, high-speed processing is difficult and a processing time that is several hundred to several thousand times longer than that needed for a common-key encryption scheme such as DES is required. Consequently, with the limited computational resources available in a digital camera, generating a digital signature using public-key encryption is very difficult.

Accordingly, there has been proposed a technique (e.g., see the specification of Japanese Patent Application Laid-Open No. 2002-244924) through which a digital signature is applied using a storage medium incorporating a microprocessor, e.g., an IC card, thereby enabling a digital signature to be applied to generated image data without greatly enhancing the capabilities of computational resources available to the digital camera.

However, the arrangement set forth in the specification of Japanese Patent Application Laid-Open No. 2002-244924 is such that the memory in an IC card is furnished with only one secret key with regard to a camera-specific ID. If a special user is provided with a secret key different from that of the general user, therefore, then the IC card having the secret key for the special user must be re-fabricated. The problem which arises is an increase in the manufacturing cost of the IC card for the special user.

SUMMARY OF THE INVENTION

Accordingly, an object of the present invention is to provide a special user with digital-signature key information that differs from that of a general user without raising manufacturing cost.

According to an aspect of the present invention, a digital signature generating apparatus having storage unit in which a plurality of secret keys have been stored, comprises: a processing unit adapted to change a secret key used by the digital signature generating apparatus to a secret key specified by a key change command if the key change command has been received, and generate a digital signature of prescribed digital data using any one of the plurality of secret keys if a signature generating command has been received.

According to another aspect of the present invention, a method of generating a digital signature in a digital signal generating apparatus having storage unit in which a plurality of secret keys have been stored, the method comprises the steps of: changing a secret key used by the digital signature generating apparatus to a secret key specified by a key change command if the key change command has been received; and generating a digital signature of prescribed digital data using any one of the plurality of secret keys if a signature generating command has been received.

According to a further aspect of the present invention, a digital signature generating apparatus, which has a plurality of secret keys, for generating a digital signature of prescribed digital data using one of the plurality of secret keys, comprises: a processing unit adapted to analyze an externally applied command, and set a secret key, which is to be used in generating the digital signature, from among the plurality of secret keys in accordance with result of the analysis.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram illustrating the main components of a digital signature generating system according to a first embodiment of the present invention;

FIGS. 4A and 4B are diagrams illustrating the data format of a command and the data format of a response;

FIG. 9 is a diagram illustrating the main components of a digital signature generating system according to a third embodiment of the present invention.

DETAILED DESCRIPTION OF THE PREFERRED EMBODIMENTS

Preferred embodiments of the present invention will now be described in detail in accordance with the accompanying drawings.

First Embodiment

First, the main components of a digital signature generating system according to a first embodiment of the invention will be described with reference to FIG. 1.

An IC card 10 is equipped with a multi-application operating system and is capable of executing multiple application programs. The IC card 10 has a storage medium (a semiconductor memory or the like) storing a plurality of secret keys and is capable of using any one of these secret keys to generate a digital signature S of digital data M (image data, etc.) contained in a command applied by a computer A20 and of outputting this digital signature S upon including it in a response. The IC card 10 may be of the contact type, contactless type or hybrid type (i.e., an IC card having both contact- and contactless-type functions). Since the IC card 10 is an apparatus that generates the digital signature S of digital data M, it can also be regarded as a "digital signature generating apparatus".

It should be noted that the computer and IC card 10 exchange data via an IC card interface incorporated in the computer or connected to the computer so as to enable communication, though this is not specifically set forth in the description that follows.

The computer A20 is one used by the vendor of the IC card 10. A recording medium 21 is one on which a program A installed in the computer A20 has been recorded. The program A, which is capable of being executed by the computer A20, is one necessary to execute processing (see FIG. 5) for changing a secret key and processing for verifying a secret key (see FIG. 6).

A computer B30 is one used by the general user or special user. A recording medium 31 is one on which a program B installed in the computer B30 has been recorded. The program B, which is capable of being executed by the computer B30, is one necessary to execute processing (see FIG. 7) for generating a digital signature.

Figure 2:
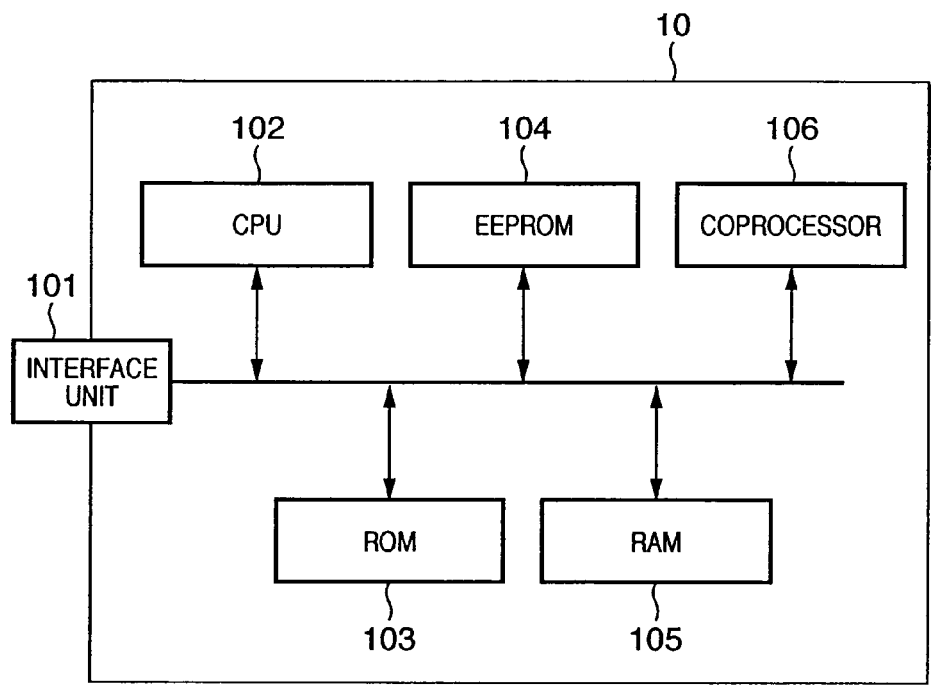
FIG. 2 is a block diagram illustrating the main structural elements of an IC card.

The main structural elements of the IC card 10 according to this embodiment will now be described with reference to FIG. 2. An interface unit 101 receives a command transmitted from the computer A20 or B30 and sends the computer A20 or B30 a response that corresponds to the command received.

A CPU (Central Processing Unit) 102 controls the operation of the IC card 10 in accordance with a plurality of application programs stored in an EEPROM (Electrically Erasable and Programmable ROM) 104.

A ROM (Read-Only Memory) 103 is a memory for storing a multi-application operating system and a command interpreter. The multi-application operating system is an operating system that manages a plurality of application programs stored in the EEPROM 104. The multi-application operating system includes an input/output function, an encryption function, a file management function, a function for adding a new application program to the EEPROM 104 and a function for deleting an application program stored in the EEPROM 104.

The EEPROM 104 is a memory that stores a key management table for managing a plurality of secret keys, a plurality of application programs and user data.

A RAM (Random-Access Memory) 105 is a memory for temporarily storing data handled by the CPU 102 and by a coprocessor 106.

The coprocessor 106 generates a digital signature S of digital data M by encrypting hash of received digital data M using one of the plurality of secret keys stored in the EEPROM 104. The coprocessor 106 utilizes a public-key code such as RSA code in the encryption algorithm.

Figure 3:
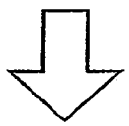
FIG. 3 is a diagram illustrating an example of a key management table.

An example of the key management table stored in the EEPROM 104 of the IC card 10 will be described next with reference to FIG. 3. The key management table is a management table for managing secret keys used by the IC card 10. A plurality of secret keys (16 in this embodiment) have been registered in the key management table, as shown in FIG. 3. A secret key at No. 0 is the secret key for the general user. The secret key on the IC card 10 immediately after the manufacture thereof will have been set to the secret key at No. 0. The secret keys at Nos. 1 to 15 are secret keys for special users. If a certain special user is to be provided with the secret key at No. 2, the vender transmits a key change command (which specifies the No. 2 secret key) to the IC card 10 using the computer A20. If execution of the key change command ends normally, the secret key on the IC card 10 will be the No. 2 secret key, thereby enabling this special user to be provided with a secret key that is different from that of the general user.

Reference will now be had to FIGS. 4A and 4B to describe the data format of the command transmitted from the computer A20 or B30 to the IC card 10 and the data format of the response transmitted from the IC card 10 to the computer A20 or B30.

A command identifying code field 401 contains a command identifying code representing the type of command. Commands include the key change command, a key verification command and a signature generation command. The key change command requests the IC card 10 to change a secret key used by the IC card 10 to a secret key that has been selected by the vender. The key verification command queries the IC card 10 about the key number of the secret key to which the IC card 10 has been set. The signature generation command requests the IC card 10 to generate the digital signature S of digital data M, such as image data that has been selected by the user.

A command data length field 402 contains the data length (the length in bytes) of a command data field 403.

The command data field 403 contains data that is transmitted to the IC card 10. In case of the key change command, the key number of the secret key desired to be set in the IC card 10 is planted in the command data field 403. In case of the key verification command, nothing is planted in the command data field 403. In case of the signature generation command, the digital data M (image data, etc.) is planted in the command data field 403.

A response data length field 404 contains the data length (the length in bytes) of a response data field 405.

The response data field 405 contains data that corresponds to the command. In a case where execution of the key change command has ended normally, the key number of the secret key that has been set in the IC card 10 is planted in the response data field 405. If execution of the signature generation command has ended normally, the digital signature of the digital data extracted from the signature generating command is planted in the response data field 405. If the key change command, key verification command or signature generation command has not ended normally, then dummy data is planted in the response data field 405.

A status code field 406 contains a status code representing the result (normal end, error, alert, etc.) of command execution.

Figure 5:
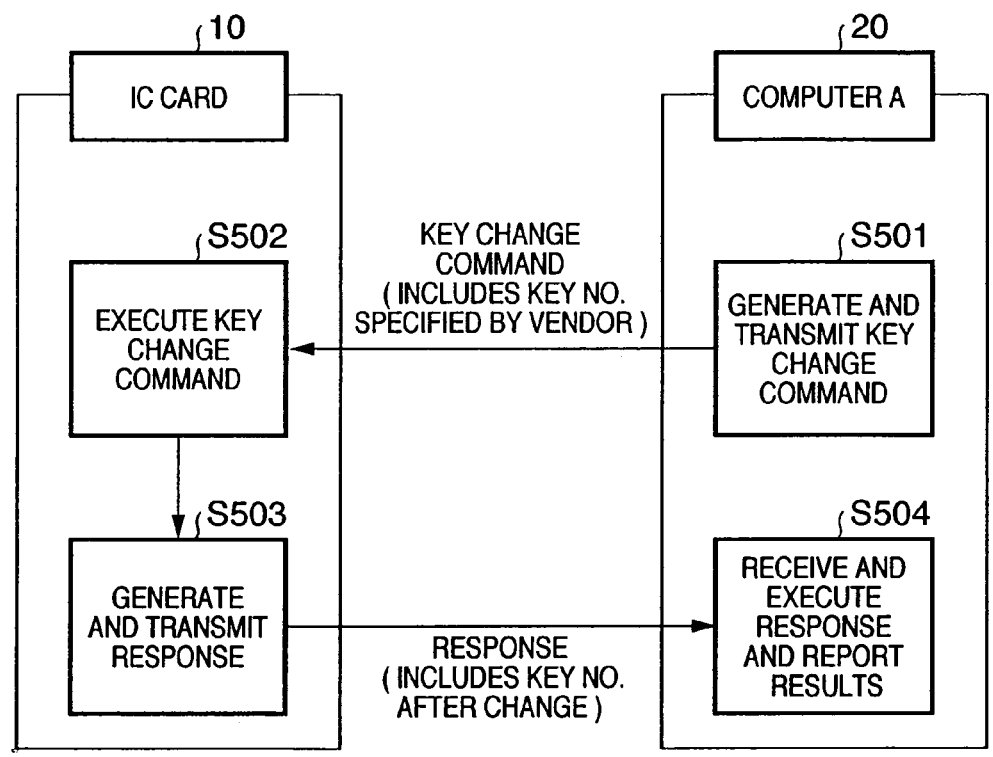
FIG. 5 is a diagram useful in describing the procedure of processing for changing a secret key.

The procedure of processing executed by the computer A20 and IC card 10 for changing a secret key will now be described with reference to FIG. 5. The processing for changing a secret key is processing for changing the secret key, which has been selected by the vendor, used by the IC card 10. This processing is executed on the vendor side after the IC card 10 is manufactured.

Step S501: The computer A20 generates a key change command in accordance with the instructions of the vendor and transmits the generated key change command to the IC card 10. At this time the key number that was selected by the vendor is present in the command data field 403 of the key change command.

Step S502: The interface unit 101 receives the key change command and supplies the CPU 102 with the key change command received. The CPU 102 extracts the key number from the command data field 403 of the key change command and updates the key management table for the purpose of enabling the key number extracted. In other words, the secret key specified by the key change command is changed to the secret key used by the IC card 10. For example, if the key number specified by the key change command is No. 3, the secret key used by the IC card 10 is changed to the No. 3 secret key.

Step S503: The CPU 102 generates a response from the result of execution of the key change command and supplies the interface unit 101 with the response generated. At this time the key number that is the result of the change is present in the response data field 405 of the response. The interface unit 101 sends this response back to the computer A20.

Step S504: The computer A20 receives and analyzes the response. If execution of the key change command ended normally, the computer A20 notifies the vendor of the key number resulting from the change. As a result, the vendor is capable of ascertaining the secret key for the digital signature that has been set in the IC card 10. If execution of the key change command did not end normally, the computer A20 uses the status code to notify the vendor of the reason why the key change command did not end normally.

Figure 6:
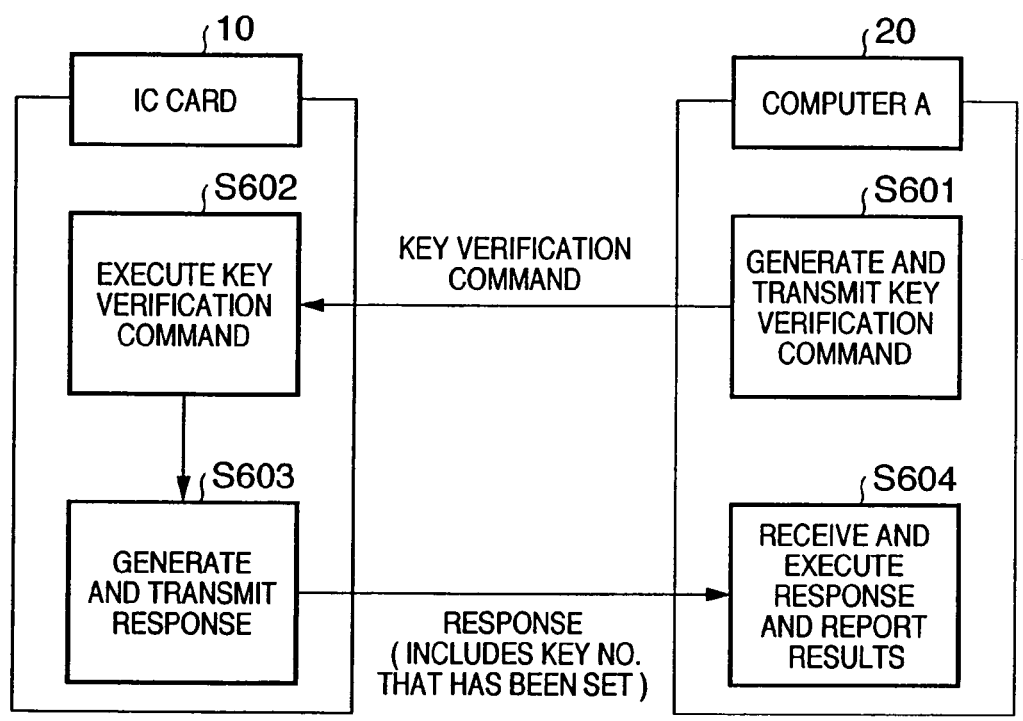
FIG. 6 is a diagram useful in describing the procedure of processing for changing a secret key.

The procedure of processing executed by the computer A20 and IC card 10 to verify a secret key will now be described with reference to FIG. 6. Processing for verification of a secret key is for verifying a secret key for a digital signature used by the IC card 10. This processing is executed on the side of the vendor.

Step S601: The computer A20 generates a key verification command in accordance with the instructions of the vendor and transmits the generated key verification command to the IC card 10. At this time nothing is present in the command data field 403 of the key verification command.

Step S602: The interface unit 101 receives the key verification command and supplies the CPU 102 with the key verification command received. The CPU 102 executes the key verification command supplied from the interface unit 101. Specifically, the CPU 102 refers to the key management table and investigates the key number to which the IC card 10 has been set.

Step S603: The CPU 102 generates a response from the result of execution of the key verification command and supplies the interface unit 101 with the response generated. At this time the key number to which the IC card 10 has been set is present in the response data field 405 of the response. The interface unit 101 sends this response back to the computer A20.

Step S604: The computer A20 receives and analyzes the response. If execution of the key verification command ended normally, the computer A20 notifies the vendor of the key number to which the IC card 10 has been set. As a result, the vendor is capable of ascertaining the secret key for the digital signature that has been set in the IC card 10. If execution of the key verification command did not end normally, the computer A20 uses the status code to notify the vendor of the reason why execution of the key verification command did not end normally.

Figure 7:
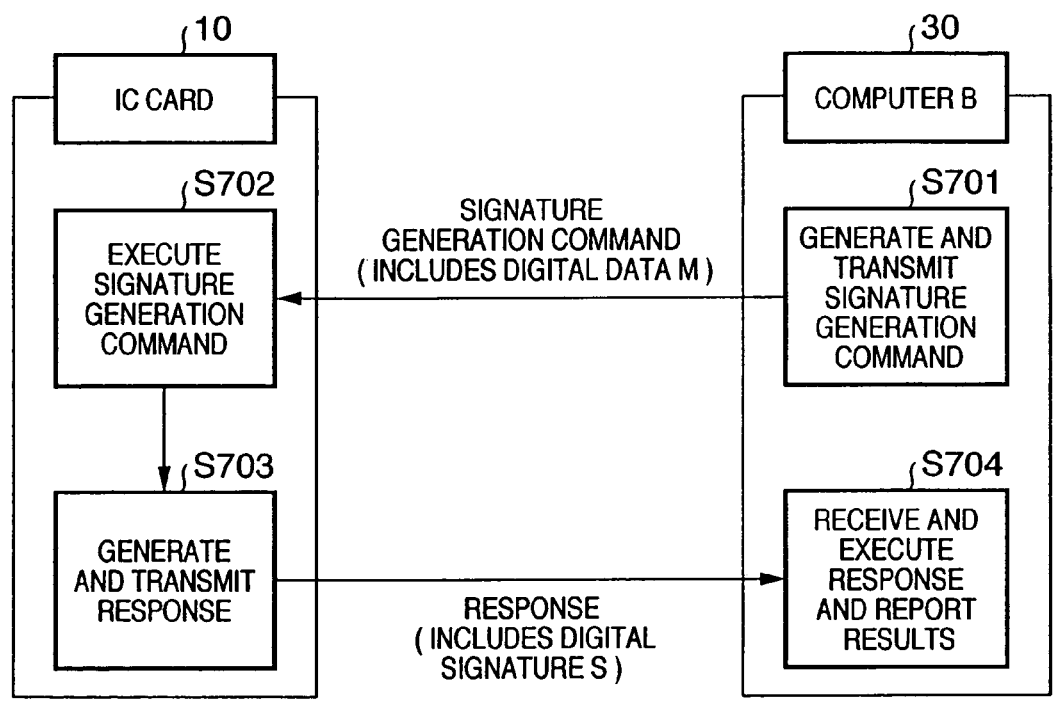
FIG. 7 is a diagram useful in describing the procedure of processing for generating a digital signature.

The procedure of processing executed by the computer B30 and IC card 10 to generate a digital signature will now be described with reference to FIG. 7. Processing for generating a digital signature is for generating the digital signature S of digital data M using the secret key for the digital signature that has been set in the IC card 10. This processing is executed on the side of the general or special user.

Step S701: The computer B30 generates a signature generation command in accordance with the instructions of the general or special user and transmits the generated signature generation command to the IC card 10. At this time the digital data M is present in the command data field 403 of the signature generation command.

Step S702: The interface unit 101 receives the signature generation command and supplies the CPU 102 with the signature generation command received. The CPU 102 extracts the digital data M from the command data field 403 and writes the extracted digital data M to the RAM 105. The CPU 102 extracts from the key management table the secret key to which the IC card 10 has been set and writes the extracted secret key to the RAM 105. In a case where the user of the computer B30 is a general user, the CPU 102 writes the No. 0 secret key to the RAM 105. In a case where the user of the computer B30 is a special user, the processor 106 writes the secret key of any one of Nos. 1 to 15 to the RAM 105. In order to generate the digital signature S of digital data M, the processor 106 generates a hash of the digital data M from the digital data M that has been read out of the RAM 105 and encrypts the generated hash by the secret key read out of the RAM 105. The coprocessor 106 writes the generated digital signature S to the RAM 105.

Step S703: The CPU 102 generates a response from the result of execution of the signature generation command and supplies the interface unit 101 with the response generated. If execution of the signature generation command ended normally, the digital signature S read out of the RAM 105 is planted in the response data field 405. If the execution of the signature generation command did not end normally, then dummy data is planted in the response data field 405. The interface unit 101 sends this response back to the computer B30.

Step S704: The computer B30 receives and analyzes the response. If execution of the signature generation command ended normally, the computer B30 notifies the user of the fact that the digital signature S was generated normally. The computer B30 then extracts the digital signature S from the response data field 405 and attaches the extracted digital signature S to the digital data M. If execution of the signature generation command did not end normally, the computer B30 notifies the user of the reason why execution of the command did not end normally.

Figure 8:
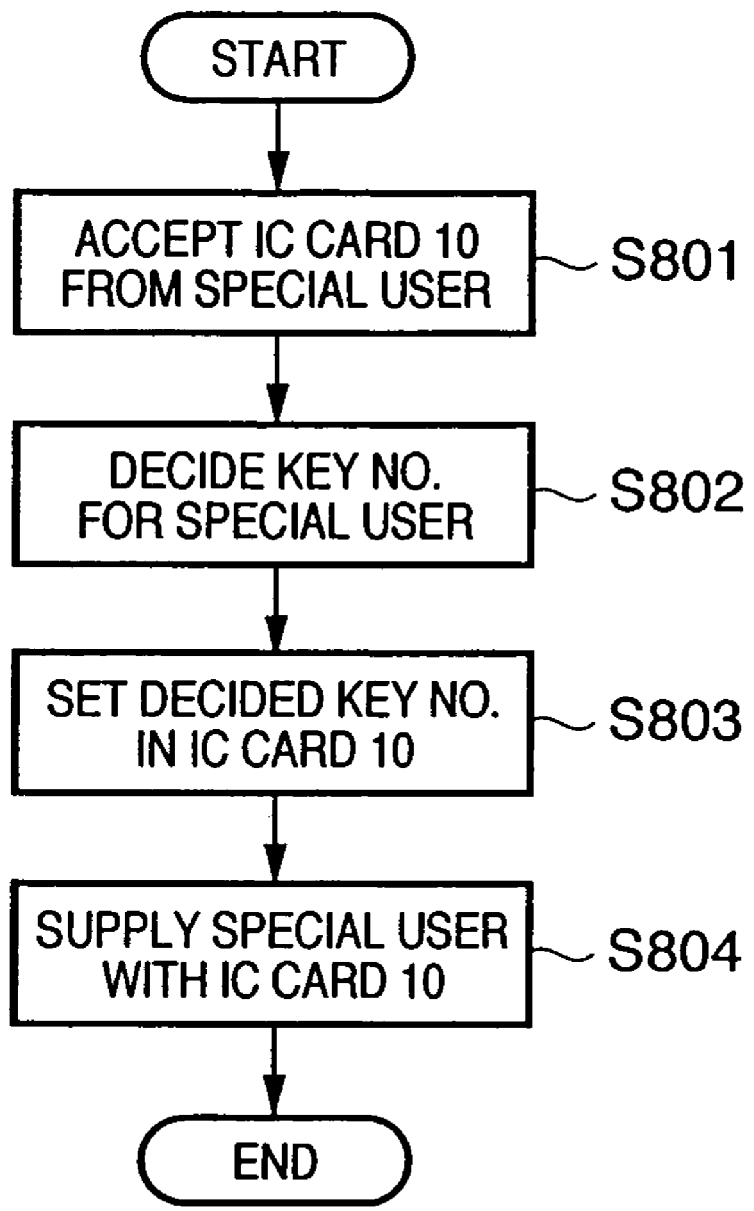
FIG. 8 is a diagram useful in describing a procedure for providing a special user with an IC card in which a secret key for the special user has been set.

Next, reference will be had to FIG. 8 to describe a procedure for supplying a special user with the IC card 10 that has been set to a secret key for the special user.

Step S801: The vendor accepts the IC card 10 from the special user.

Step S802: The vendor decides the key number (any one of Nos. 1 to 15) that the special user will be allowed to use.

Step S803: The vendor sets the IC card 10 to the key number decided at step S802. The above-described key change command is used to set the key number. A secret key different from that of the general user (the key number of the general user is No. 0) is set in the IC card 10 by this processing. For example, if the key number decided at step S802 is No. 3, then the secret key of IC card 10 becomes the secret key corresponding to No. 3.

Step S804: The vendor supplies the IC card 10 to the special user. As a result, the vendor is capable of supplying the special user with a secret key for a digital signature different from that of the general user.

Thus, in accordance with the IC card 10 of the first embodiment, the secret key used can be changed by a key change command. As a result, a special user can be provided with a secret key for a digital signature different from that of a general user without raising the cost of manufacturing the IC card 10. Further, since a plurality of secret keys for special users can also be stored, even a plurality of special users can be provided with respective ones of secret keys for digital signatures different from that of the general user.

Further, in accordance with the IC card 10 of the first embodiment, the fact that the card can be equipped with a multi-function operating system makes it easy to add on a new application program. In other words, this makes it each to adopt a new algorithm for generating digital signatures, to update the key management table and to add on entirely new functions.

Second Embodiment

With the above-described processing for generating a digital signature, the digital data M is contained in the command data field of the signature generation command. However, it is also possible to replace the digital data M with the hash of the digital data M. In such case the hash of the digital data M need no longer be generated within the IC card 10 and, as a result, it is possible to lighten the load upon the IC card 10 and to generate the digital signature S at high speed. Further, it is also possible to reduce the data size handled by the IC card 10 in such case (because the data size of the hash value of the digital data M is sufficiently smaller than the data size of the digital data M). As a result, the size of the circuitry on the IC card 10 can be reduced and the cost of manufacturing the IC card 10 can be reduced.

Third Embodiment

The computer B30 can be replaced by an image sensing apparatus such as a digital camera, digital video camera or scanner. FIG. 9 illustrates the main components of a digital signature generating system according to a third embodiment of the invention. An image sensing apparatus 40 is an apparatus having an image sensing unit for sensing the image of a subject. Examples of the apparatus are a digital camera, digital video camera and scanner. A recording medium 41 is a medium on which a program necessary for executing the above-described processing for generating digital signatures has been recorded. In this case, a digital signature of original image data representing an image sensed by the image sensing apparatus can be generated by the IC card 10.

Other Embodiments

Note that the present invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

The configurations and structures of each of the components shown in the above embodiments all do nothing more than illustrate mere examples of concrete implementations for working the present invention and the technical scope of the present invention should not be interpreted as being limited by these examples. In other words, the present invention can be worked in a variety of forms without departing from the spirit of the invention or the main features thereof.

In accordance with the present invention, as described above, a secret key for a digital signature that is different from that of a general user can be provided to a special user without raising the cost of manufacture.

As many apparently widely different embodiments of the present invention can be made without departing from the spirit and scope thereof, it is to be understood that the invention is not limited to the specific embodiments thereof except as defined in the appended claims.

What is claimed is:

1. A digital signature generating apparatus that generates a digital signature of digital data, comprising:
a receiving unit that receives one of a first command and a second command, the first command including information indicating one of a plurality of secret keys, the plurality of secret keys being included in the digital signature generating apparatus, the second command including a hash value of the digital data;

a secret key changing unit that changes a secret key used by the digital signature generating apparatus to a secret key specified by the first command, if the first command is received by the receiving unit; and a digital signature generating unit that generates the digital signature of the digital data from the hash value extracted from the second command, if the second command is received by the receiving unit, wherein the digital signature generating unit encrypts the hash value extracted from the second command using the secret key specified by the first command, in order to generate the digital signature of the digital data.

2. The digital signature generating apparatus according to claim 1, wherein the digital signature generating apparatus is an IC card.

3. The digital signature generating apparatus according to claim 1, wherein the digital signature generating apparatus is an apparatus including a multi-application operating system.

4. The digital signature generating apparatus according to claim 1, further comprising:

a storage unit that stores the plurality of secret keys.

5. The digital signature generating apparatus according to claim 1, wherein the digital data includes image data.

6. A method for controlling a digital signature generating apparatus that generates a digital signature of digital data, the method comprising:

a receiving step of receiving one of a first command and a second command, the first command including information indicating one of a plurality of secret keys, the plurality of secret keys being included in the digital signature generating apparatus, the second command including a hash value of the digital data;

a secret key changing step of changing a secret key used by the digital signature generating apparatus to a secret key specified by the first command, if the first command is received in the receiving step; and a digital signature generating step of generating the digital signature of the digital data from the hash value extracted from the second command, if the second command is received in the receiving step, wherein the hash value extracted from the second command is encrypted in the digital signal generating step using the secret key specified by the first command, in order to generate the digital signature of the digital data.

7. The method according to claim 6, wherein the digital signature generating apparatus is an IC card.

8. The method according to claim 6, wherein the digital signature generating apparatus is an apparatus including a multi-application operating system.

9. The method according to claim 6, wherein the digital signature generating apparatus includes a storage unit that stores the plurality of secret keys.

10. The method according to claim 6, wherein the digital data includes image data.

* * * * *